(No Model.)
F. A. JENNINGS.
ANNUNCIATOR.
No. 572,057.    3 Sheets—Sheet 1.    Patented Nov. 24, 1896.
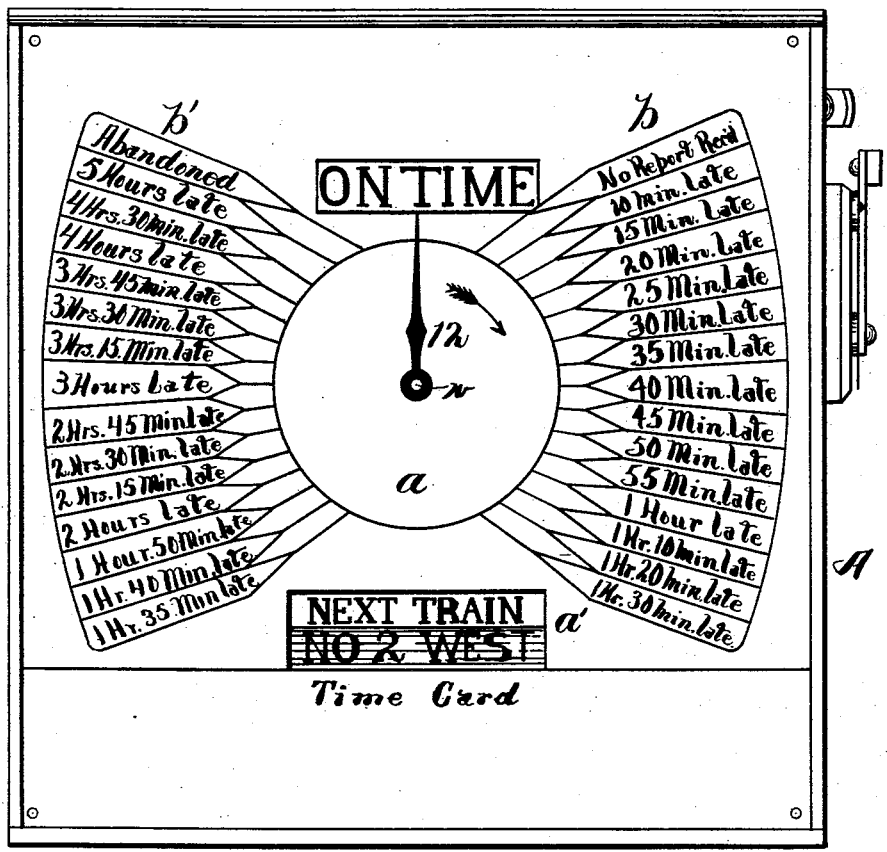
Fig. 1.
Fig. 3.
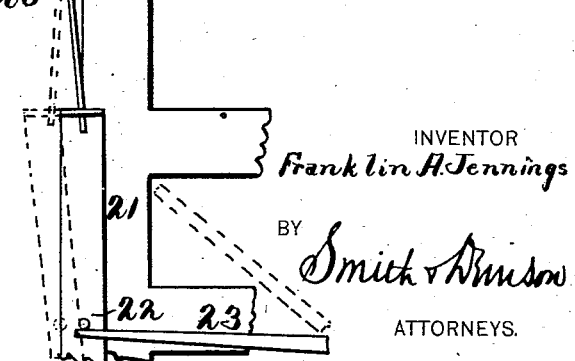
WITNESSES:
Charles N. Marvin
Jessie E. Murray
INVENTOR
Franklin A. Jennings
BY
Smith & Brinson
ATTORNEYS.
THE NORRIS PETERS CO., PHOTO-LITHO., WASHINGTON, D. C.

(No Model.) 3 Sheets—Sheet 2.
F. A. JENNINGS.
ANNUNCIATOR.
No. 572,057. Patented Nov. 24, 1896.
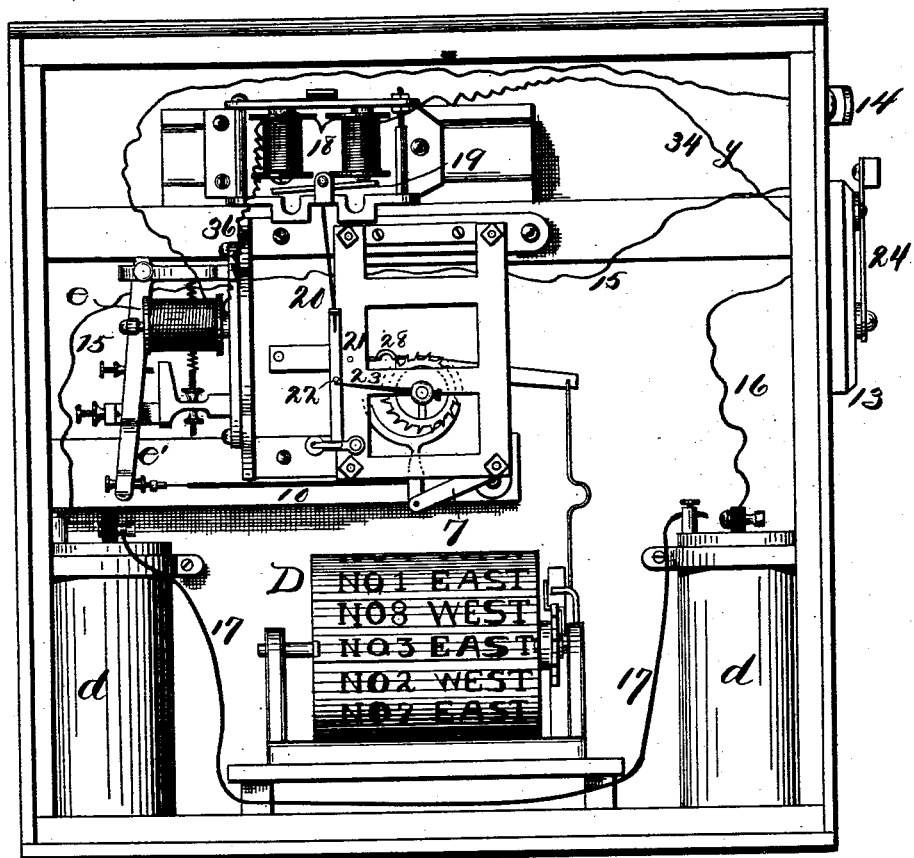
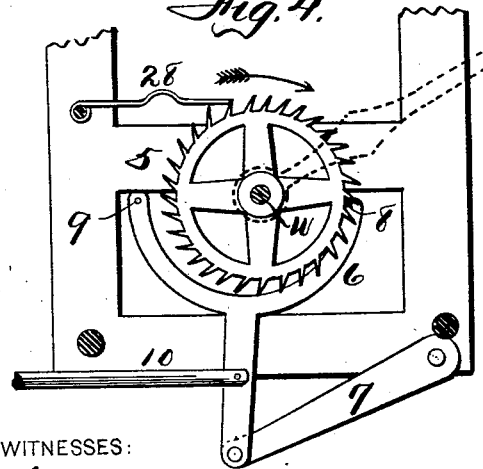
Fig. 4.
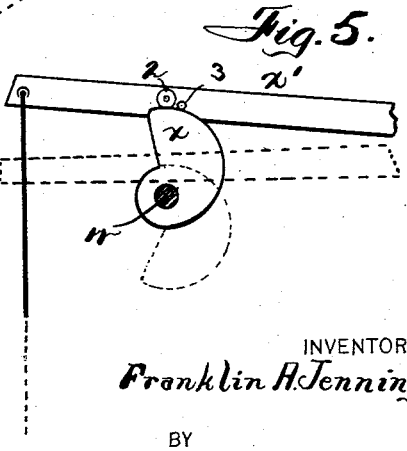
Fig. 2.
Fig. 5.
WITNESSES:
Charles N. Morrow
Jessie E. Murray
INVENTOR
Franklin A. Jennings
BY
Smith & Bristow
ATTORNEYS.

(No Model.) 3 Sheets—Sheet 3.
F. A. JENNINGS.
ANNUNCIATOR.
No. 572,057. Patented Nov. 24, 1896.
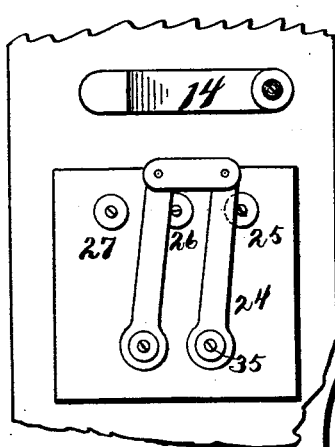
Fig. 10.
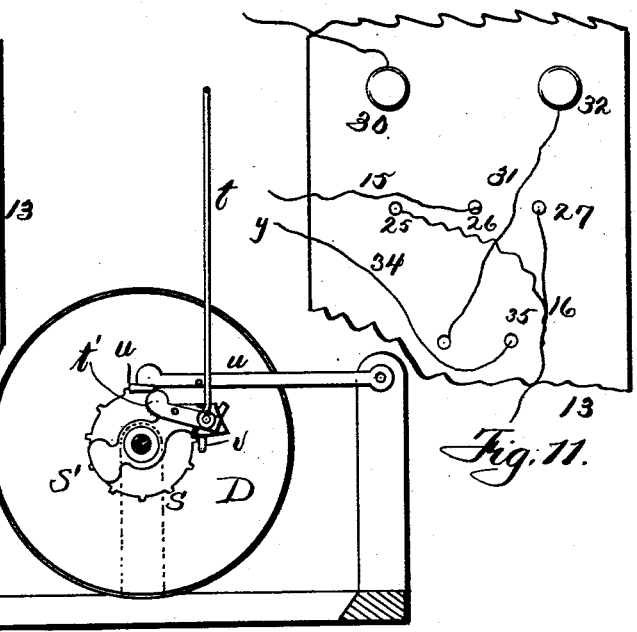
Fig. 9.
Fig. 11.
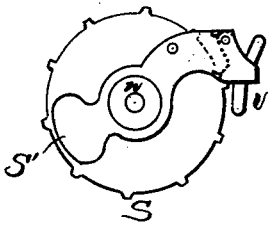
Fig. 7.
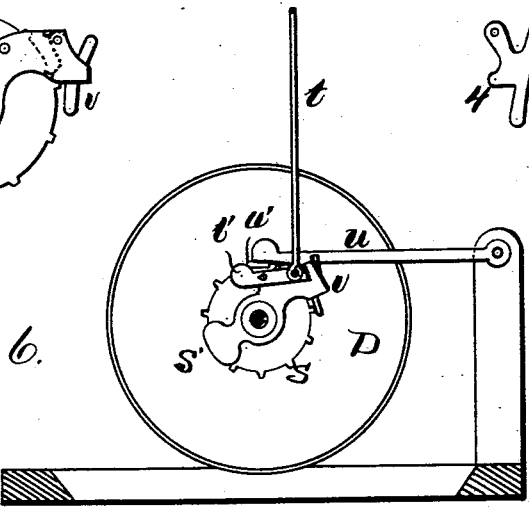
Fig. 8.
Fig. 6.
Fig. 12.
WITNESSES:
Charles W. Marvin.
Jesse D. Murray.
INVENTOR
Franklin A. Jennings
BY
Smith & Denslow
ATTORNEYS.
THE NORRIS PETERS CO., PHOTO-LITHO., WASHINGTON, D. C.

UNITED STATES PATENT OFFICE.

FRANKLIN A. JENNINGS, OF ITHACA, NEW YORK, ASSIGNOR TO THE ELECTRIC BULLENTIN COMPANY, OF SAME PLACE AND CHICAGO, ILLINOIS.

ANNUNCIATOR.

SPECIFICATION forming part of Letters Patent No. 572,057, dated November 24, 1896.

Application filed May 11, 1895. Serial No. 548,908. (No model.)

*To all whom it may concern:*

Be it known that I, FRANKLIN A. JENNINGS, of Ithaca, in the county of Tompkins, in the State of New York, have invented new and useful Improvements in Annunciators, of which the following, taken in connection with the accompanying drawings, is a full, clear, and exact description.

My invention relates to machines and apparatus indicating the movements or status of railway-trains, whether on time or behind time and how much, said machines to be used separately or in a series located at different places and electrically connected to a primary machine, so that when said primary machine is operated all of the others in the series will be operated in like manner to indicate and give the same information to the public.

My object is to improve the construction and operation of the machine by providing it with mechanism to be used in case all of the machines upon a given circuit fail to operate synchronously, so that if by means of a skip or failure from any cause to make a circuit in any one one or more machines have fallen behind the primary machines then said mechanism can be operated in the primary machine and in all others which are then synchronous with it to stop the indicating-pointer therein until all of the others have caught up, and then by means of a switch the current is shifted to reverse the poles of the electromagnet and vibrate the armature to shift the stop mechanism and simultaneously release the pointers in all of the machines; also providing it with a train-designating cylinder and a rotating mechanism actuated to rotate said cylinder a single space with each full rotation of the pointer to bring into view the designation of the next train; also providing it with an electromagnet to propel the pointer and a suitable key and switch board and switch for making and breaking the circuit in said electromagnet and switching the circuit in the stop-electromagnet; also providing an escapement to impart an isochronous movement to the pointer, and also providing the lever with which the lifting-cam in the cylinder-rotating mechanism engages, with a check-pin which engages with the cam after the lifter on said lever has passed the apex of the cam, in order to prevent the cylinder from becoming locked "on the center" and until an additional impulse is given to the cam, when the lever will fall the full distance and rotate the cylinder one space.

My invention consists in the several novel features of construction and operation hereinafter described and which are specifically set forth in the claims hereunto annexed.

It is constructed as follows, reference being had to the accompanying drawings, in which—

Figure 1 is a front elevation of the machine. Fig. 2 is a like view of the same having the dial-plate front removed. Fig. 3 is an enlarged detail of the pointer stop mechanism. Fig. 4 is a detail of the pointer-escapement. Fig. 5 is a detail of the lifting cam and lever in the cylinder-rotating mechanism. Fig. 6 is an elevation of the cylinder-rotating mechanism, showing the lever raised. Fig. 7 is an enlarged elevation of the ratchet-and-pawl mechanism therein. Fig. 8 is a plan of the pawl therein. Fig. 9 is an elevation of the cylinder-rotating mechanism, showing the lever dropped. Fig. 10 is a front elevation of the key and switch board. Fig. 11 is a rear elevation of the same. Fig. 12 is a top plan of the stop-pawl.

Several of the features of this invention are shown and described in Letters Patent issued to me May 28, 1895, No. 539,870, for an annunciator, and these will therefore be only referred to herein.

A is a case, and $a$ is a suitable dial-plate provided with a slotway $a'$ and with train-bulletin tables $b$ $b'$, arranged in substantially radial lines. In said case a suitable battery $d$ is placed, comprising as many cells as desired, and $e$ is an electromagnet suitably connected thereto and having an armature $e'$ hinged to its frame.

D is a train-indicating cylinder mounted upon a shaft journaled in a suitable frame and carrying upon its periphery a strip or piece of paper inscribed with suitable words and figures to designate the several trains. Upon this shaft a ratchet-wheel $s$ is secured.

A counterbalance $s'$ is loose upon said shaft, and the lifting-rod $t$ is connected thereto. The lifting-pawl $t'$ is pivotally hung upon said counterbalance and engages with a lip $U'$ upon the stop-pawl $U$, and the push-pawl $v$ is also pivoted thereon and adapted to engage with the ratchet-teeth, and when raised to lift the stop-pawl out of engagement, so that when raised and released the specific gravity of the lever-rod and counterbalance is sufficient to rotate the cylinder one space or until it is stopped by the reëngagement of the stop-pawl therewith.

The rod $t$ is connected to the lever $x'$, with which the cam $x$ on the pointer-shaft $w$ engages, so that as the cam is rotated by the step-by-step movement each time a circuit is made in the primary electromagnet said lever is raised, and this lifts the pawl into engagement with the next tooth and raises the stop-pawl also, leaving the cylinder free to be rotated when the lever drops.

An idler-roller 2 is mounted upon the lever in position to engage with the cam, and upon said lever, just back of this idler, is a check-pin 3, so that when the idler reaches and passes the apex of the cam the lever will drop a short distance, so that the idler is disengaged from the cam, which starts the cylinder to rotate and, so to speak, throws it "off the center," and the check-pin rests upon the cam until another impulse is given through the electromagnet, which will rotate the cam sufficiently to disengage said pin therefrom and permit the lever to drop the full distance and rotate the cylinder the remainder of the train-designating space and display the train-title through the slot in the dial or front of the case. As in Fig. 2, the title "No. 3 east" is in position to be displayed, and in Fig. 1 the cylinder has been rotated one space, so as to display the title of the next train, "No. 2 west." The shoulder 4 of the push-pawl is actuated by gravity and is balanced so that it swings into engagement with the next ratchet-tooth when the lever is raised.

The escapement comprises a scape-wheel 5, mounted upon the pointer-shaft $w$ in a suitable frame, a yoke 6, pivotally mounted upon said frame, or a bar 7, secured thereto and provided with pallets 8 9 in the respective arms of the yoke, and a rod 10, connected thereto and to the armature of the primary magnet, so that when a circuit is made through said magnet the armature will rock said yoke over to the right, releasing the scape-wheel from the stop-pallet 8 and throwing the pallet 9 onto the inclined face of a scape-tooth. Then the breaking of the circuit swings the pallet 9 away from and brings the pallet 8 into engagement with the scape-wheel to lock it. Thus each vibration of the armature turns the scape-wheel the distance of one tooth, and thus this electromagnet is the sole motor for rotating the cam $x$, which is secured upon the scape-wheel shaft to raise the lever and operate the cylinder-rotating mechanism; also, as the pointer 12 is also secured upon said shaft it is actuated and shifted from one train-bulletin to the next.

A switchboard 13 is located in any suitable or convenient place and provided with an ordinary key 14.

Usually a number of these machines are connected together, as shown in my aforesaid application, and located at suitable points, as in the principal hotels of a city or village, with the central one at the depot, so that all are simultaneously operated therefrom and all indicate the same train and the same train-bulletin. I have discovered, however, that sometimes, through defective wiring or defective contacts, there are liable to be defects in the working of one or more machines of a series, so that all do not indicate the same information, the pointer of one or more being behind the others. In order to remedy this to some extent and in order that all shall start at "On time," I use a suitably-mounted secondary polarized electromagnet 18, provided with a rocking armature 19, centrally pivoted and adapted by suitable wiring and a switch to reverse its poles and oscillate the armature. A rod 20 is connected to said armature, engaging with an oscillating bar 21, provided with a pin 22, with which an arm 23 upon the scape-wheel or pointer-shaft engages at the time when the pointer reaches "On time" and stops the pointer and locks the escapement of all machines in which the pointer is at that point against movement, but leaves the others free to operate by the impulses incident to the operation of the key until all stand "On time."

A parallel-bar switch 24 is mounted upon the switchboard, provided with two contacts, and 25 26 27 are contact-points upon the board, so that, for instance, when the switch makes contacts with the points 25 and 26 the armature 19 is in the position shown in Fig. 2, and the scape-wheel and pointer are locked as aforesaid. Then shifting the switch makes contacts with the points 26 and 27, the armature reverses its poles, which swings the rod 20 and bar 21 so as to disengage the pin 22 from the arm 23 and release the pointer, so that it will be operated at the next impulse given by the key.

A pawl 28 engages with the scape-wheel to prevent its backward rotation. The wire 29 connects the primary electromagnet to the binding-post 30 of the contact-key, and the wire 31 leads from the binding-post 32 at the other end of said key to the lower end of the switch-bar 24. The wire 34 connects the secondary electromagnet to the point 35 on the switchboard, and the wire 36 connects this electromagnet to the primary one.

The wire 15 leads from the negative pole of the battery to the point 26 and the wire 16 from the positive pole thereof to the point 27, and a branch wire leads from the wire 16 to the point 25. Then when the switch-bars make contacts on points 25 and 26 the current through the switch-bar 24 is positive, and when they make contacts on points 26 and 27 the current is negative, and this reverses the polarity of the electromagnet and rocks the armature.

Having described my invention, what I claim, and desire to secure by Letters Patent, is—

1. A dial containing train-bulletins, a pointer mounted upon a pointer-shaft and a scape-wheel also upon said shaft, in combination with an electromagnet, an escapement-yoke mounted upon a pivot and provided with pallets adapted to engage with said scape-wheel and a rod adjustably connecting said yoke to the armature of said magnet whereby said scape-wheel is intermittently rotated by the making and breaking of the circuit through said magnet.

2. The combination with a stationary dial, a rotating shaft, a pointer thereon and an arm also thereon and means to rotate said shaft to shift said pointer and arm, of an electromagnet a rocking armature therefor, a rod secured to and vibrated by said armature, an oscillating bar connected to and actuated by said rod, and provided with a pin with which said arm is adapted to engage to stop said shaft and pointer, and a parallel-bar switch to reverse the polarity of said electromagnet and cause it to rock to oscillate said bar and lock and unlock said arm.

3. In an annunciator, the combination with a primary electromagnet, an escapement actuated thereby, a shaft, a pointer thereon, and an arm upon said shaft actuated by said escapement, of a secondary electromagnet having a rocking armature, a vibratory rod secured to said armature, an oscillating bar connected to said rod and provided with a pin with which said shaft-arm is adapted to engage to stop or release said shaft and pointer, and a parallel-bar switch to reverse the polarity of said secondary electromagnet and cause its armature to rock and oscillate said bar and pin to become engaged with or released from said arm.

4. In an annunciator, the combination with a train-designating rotatable cylinder, a pawl-and-ratchet mechanism to rotate it and a lifting-lever carrying said pawl, and a rotating cam engaging with said lever, of an idler upon said lever primarily engaging with said cam and a check-pin upon said lever adapted to engage with said cam after the idler has passed the apex thereof.

In witness whereof I have hereunto set my hand on this 2d day of May, 1895.

FRANKLIN A. JENNINGS.

In presence of—
C. W. SMITH,
JESSIE E. MURRAY.